United States Patent [19]
Loewy et al.

[11] 3,988,420
[45] Oct. 26, 1976

[54] PROCESSES FOR THE MANUFACTURE OF FEED-GRADE DICALCIUM PHOSPHATE AND PHOSPHORIC ACID

[75] Inventors: Dalith Loewy; Chava Fink, both of Haifa, Israel

[73] Assignee: Israel Chemicals Ltd., Tel Aviv, Israel

[22] Filed: Apr. 22, 1975

[21] Appl. No.: 570,517

[30] Foreign Application Priority Data
June 5, 1974 Israel.................................. 44977

[52] U.S. Cl............................. 423/157; 423/167; 423/319
[51] Int. Cl.$^2$......................................... C01B 25/16
[58] Field of Search........ 423/167, 319, 321, 321 S, 423/157

[56] References Cited
UNITED STATES PATENTS
3,033,669  5/1962  Strauchen et al.................... 423/167
3,556,724  1/1971  Fuchs et al. ........................ 423/167

OTHER PUBLICATIONS
Slack, (Phosporic Acid, vol. I, part 1, pp. 43–44).

*Primary Examiner*—Herbert T. Carter
*Assistant Examiner*—Wayne A. Langel
*Attorney, Agent, or Firm*—John S. Roberts, Jr.

[57] ABSTRACT

The invention relates to a combined process for the manufacture of feed grade dicalcium phosphate and pure phosphoric acid. The process comprises the reaction of an excess of phosphate rock with aqueous solutions of a mineral acid selected from hydrochloric acid, phosphoric acid and nitric acid, characterized by the fact that the free acidity of the dissolution liquor does not exceed 60% and that in the clear solution feed grade dicalcium phosphate is precipitated with calcium hydroxide, calcium carbonate or mixtures thereof. The solids comprising the unattacked phosphate are decomposed with hydrochloric acid solutions, gases containing hydrogen chloride or mixtures thereof and the acidulate containing the phosphoric acid is extracted with an organic solvent selected from butanols, pentanols or mixtures thereof, the phosphoric acid-solvent extract is separated and washed, thus obtaining the pure phosphoric acid.

6 Claims, No Drawings

PROCESSES FOR THE MANUFACTURE OF FEED-GRADE DICALCIUM PHOSPHATE AND PHOSPHORIC ACID

The present invention relates to an improved process for the manufacture of dicalcium phosphate (hereinafter referred to as DCP) and for the manufacture of pure phosphoric acid. The dicalcium phosphate obtained is characterized by a low fluorine content which is useful as a supplement to animal food and is thus designated in the trade as "feed-grade DCP".

Various methods are known which provide DCP for fertilizer purposes and feed-grade DCP. These methods may be divided into two main groups:

a. methods based on the neutralization of phosphoric acid by lime or calcium carbonate and b. methods based on the utilization of rock phosphate wherein the rock phosphate is first attacked by a mineral acid such as HCl or $HNO_3$ and the dissolution liquor subsequently obtained neutralized by lime or calcium carbonate.

The methods included in group (b), to which the present invention bears a closer relationship, are more widely used since cheap raw material such as phosphate rock is used but they require purifying operations on the dissolution liquor in order to obtain feed-grade DCP. In addition, serious problems arise in the separation of the insoluble matter from the dissolution liquor, resulting in severe loss of $P_2O_5$. In order to reduce $P_2O_5$ losses during the acidulation step and separation of the insoluble matter, various expedients have been proposed. However, till now, all the known methods based on phosphate rock have suffered from $P_2O_5$ losses during the acidulation and separation operations. The losses encountered in the acidulation operation were due to the degree of solubilization of the phosphate rock. To overcome these losses, a relatively prolonged reaction time was suggested between the mineral acid and the phosphate rock. Further, if the conditions of the reaction such as pH, concentration and temperature are not properly chosen, the separation of the undissolved residue is very slow and makes the separation of the reaction mass very difficult. In the last 20 years, the process for phosphoric acid manufacture by solvent extraction has been developed. According to this process, phosphate rock is acidulated with aqueous HCl or aqueous $HNO_3$ and the phosphoric acid extracted from the dissolution liquor by an organic solvent, the impurities remaining in the aqueous phase. The process is based on the observation that, in the presence of $CaCl_2$ or $Ca(NO_3)_2$, the distribution coefficient of $P_2O_5$ between an aqueous phase and an organic solvent phase is largely in favour of the organic solvent. The solvent extract containing the phosphoric acid is separated from the aqueous raffinate and is back-extracted into an aqueous phase while the organic solvent is recycled to the extraction stage. The pure phosphoric acid produced by solvent extraction can be concentrated to 80–95% $H_3PO_4$ without any technological problems, thus saving transportation costs. This is another advantage over the common, wet-process phosphoric acid, in addition to its high purity. However, recent economic reports show that the process is feasibly attractive particularly where cheap by-product hydrochloric acid is available. There are indeed many processes which lead to aqueous hydrochloric acid by-products but the concentration of the hydrochloric acid is usually very low — 5 to 8% by weight. In such cases, prior concentration of the hydrochloric acid is required before use and this, of course, affects the economic feasibility of the use of the hydrochloric acid for the manufacture of phosphoric acid by solvent extraction. For the acidulation of phosphate rock (28% $P_2O_5$), the concentration of aqueous hydrochloric acid suitable for the process is around 22% (by weight), wherein a dissolution liquor with about 80–100 g/l $P_2O_5$ is obtained. More diluted aqueous solutions of HCl will result in dissolution liquors with lower concentratons of $P_2O_5$ which cause problems in subsequent steps of the phosphoric acid production. As known, the lower the $P_2O_5$ concentration in the dissolution liquor, the lower will be the distribution coefficient of $PO_4^{---}$ ion between the solvent and the aqueous phase. It is the object of the present invention to describe a combined process for the manufacture of feed-grade DCP and pure phosphoric acid from phosphate rock. It is another object of the present invention to describe a combined process for the manufacture of feed-grade DCP and pure phosphoric acid without any prior defluorination step for the DCP feed-grade manufacture. It is still another object of the present invention to describe a combined process for the manufacture of feed-grade DCP and pure phosphoric acid wherein dilute, by-product aqueous hydrochloric acid is utilized for the manufacture of DCP, thus improving the economic feasibility of phosphoric acid manufacture by solvent extraction. These, and other objects of the present invention which may appear as this specification proceeds, are achieved by the present invention.

The invention consists of a combined process for the manufacture of feed-grade DCP and phosphoric acid from rock phosphate which comprises:

a. reacting excess comminuted calcareous phosphate rock with aqueous solutions of a mineral acid selected from hydrochloric acid, phosphoric acid and nitric acid, characterized by the fact that the free acidity (as defined in the specification) of the dissolution liquor does not exceed 60%;

b. separating the clear solution from the solids;

c. precipitating the feed-grade DCP from the clear solution obtained in step (b) by the addition of calcium hydroxide, calcium carbonate or mixtures thereof;

d. reacting the solids obtained in step (b) with hydrochloric acid at a temperature between ambient temperature and approximately 120° C to produce an acidulate containing phosphoric acid;

e. separating the acidulate containing phosphoric acid obtained in step (d);

f. extracting the acidulate separated in step (e) with a phosphoric acid-miscible, calcium chloride-immiscible organic solvent selected from butanols, pentanols and mixtures thereof, to form a mutually immiscible brine phase containing calcium chloride and a phosphoric acid-solvent extract phase;

g. separating the phosphoric acid-solvent extract phase from the calcium chloride-containing brine phase and h. separating the phosphoric acid from the solvent extract phase obtained in step (g), said phosphoric acid-miscible solvent being recycled to step (f).

The combined process of DCP manufacture and phosphoric acid production minimizes any losses of $P_2O_5$ normally encountered in the attack on rock phosphate by a mineral acid in the DCP manufacture since, according to the present invention, the reaction system for the manufacture of DCP implies an excess of phosphate rock in which almost the entire $P_2O_5$ content is solubilized in step (d).

Another important advantage of the present invention is that for step (a), wherein only a part of the phosphate rock is attacked, any source of mineral acid selected from hydrochloric acid, nitric acid or phosphoric acid may be used and even dilute acid with a concentration in the range of 2–20% by weight HCl, $HNO_3$ or $H_3PO_4$ may successfully be used. Furthermore, the use of an excess of phosphate rock will cause a certain upgrade of the $P_2O_5$ content in the unattacked phosphate rock since, as known, most of the calcium carbonate present in the phosphate rock is more easily attacked and solubilized.

The result is that in step (d), the unattacked phosphate rock which remains from step (a) will be more concentrated in $P_2O_5$, thus facilitating the production of dissolution liquors with requisite $P_2O_5$ concentrations. In accordance with a particular, preferred embodiment of the present invention, the wash water stream of the insoluble matter resulting from the attack on the residual phosphate rock in step (d), which contains acidic components of HCl and $H_3PO_4$, can be successfully used for the first step of the acidulation of part of the phosphate rock in step (a).

The reaction in step (a) between the mineral acid — hydrochloric acid, nitric acid or wash water containing phosphoric acid — is carried out at ambient temperature (16–30° C) and usually, after a reaction time of 10–45 minutes, a free acidity below 60% is attained. By imposing this upper limit of free acidity in step (a), the fluoride component of the phosphate rock is left in the solid phase and a dissolution liquor suitable for the manufacture of feed-grade DCP is obtained. Thus, in accordance with the present invention, no separate step is required for the defluorination of the dissolution liquor utilized in the feed-grade DCP production and no loss of $P_2O_5$ is involved in the dissolution liquor production. This is an additional advantage compared with the previous methods where a compromise had to be made between the conditions for maximum solubilization of $P_2O_5$ from the phosphate rock and minimum solubilization of the fluoride present in the rock.

For extremely low fluorine content in the dissolution liquor, an additional defluorination step may be performed according to known methods.

The calcareous phosphate rock to be utilized in the process of the present invention is uncalcined and may be of low grade regarding its $P_2O_5$ content. In contrast to the previous methods, where a high $P_2O_5$ concentration in the rock was suggested for the manufacture of $H_3PO_4$ by solvent extraction, in accordance with the present invention, this requirement is superfluous as an upgrade of the phosphate rock occurs after the first step, when a substantial part of the calcium carbonate in the rock reacts with the mineral acid introduced into the reaction.

The phosphate rock is preground so that preferably about 70% of the phosphate rock particles are smaller than about 45 US mesh. The term free acidity as used in the present invention has the usual meaning which is percent $P_2O_5$ solubilized as phosphoric acid ($H_3PO_4$) from the total $P_2O_5$ in solution. As known, monocalcium phosphate $Ca(H_2PO_4)_2$ is also formed as a soluble component by the reaction of a mineral acid with phosphate rock. Thus, a maximum free acidity of 60% which may be present after the acidulation according to step (a) means that a maximum of 60% from the total $P_2O_5$ solubilized in the aqueous solution is present in the dissolution liquor as $H_3PO_4$. The preferred free acidity found to yield the best results for the feed-grade DCP is between 20 to 50%. This constitutes another important advantage of the present invention since a considerable proportion of mineral acid is saved in the manufacture of dicalcium phosphate. By imposing an upper limit of free acidity, i.e. not more than 60% and preferably in the range of 20–50%, the balance of 80 to 40% of the dissolved $P_2O_5$ will be in the form of monocalcium phosphate.

The unattacked phosphate rock settles rapidly and the insoluble matter normally present in phosphate rock generally settles after the addition of a common flocculant. The decanted solution can be further filtrated in order to remove the fine particles which the dissolution liquor may still contain. Usually, the decanted solution has a very low fluorine content, in the order of 0.1 g/l, which is permissible for animal feed. No particular treatment is necessary for the coarse solids obtained in step (b), although they still contain some adhered mother liquor, since these solids are further acidulated in step (d) for a complete recovery of $P_2O_5$ values. The solution obtained in step (b) is transformed into feed-grade DCP — in step (c) — by treating it with lime, calcium carbonate or mixtures thereof, according to the known method.

The solids separated in step (b) are further treated (step d) with aqueous hydrochloric acid or gases containing hydrogen chloride such as are obtained in the thermal decomposition of metal chloride solutions. Since most of the calcium carbonate present in the phosphate rock has previously been decomposed step (a) and removed in step (b), the $P_2O_5$ content of the solids is higher than the $P_2O_5$ content present in the original phosphate rock. The reaction occurs at a temperature between ambient temperature and 120° C and a reaction time of 10 to 30 minutes is usually sufficient. This acidulation is carried out with aqueous hydrochloric acid solutions which contain more than 15% HCl (by weight). The use of over-diluted HCl solutions should be avoided since the dissolution liquor obtained will have a low $P_2O_5$ content. In general, aqueous solutions containing over 18% HCl (by weight) are preferred, as they result in dissolution liquors with about 90–110 g/l $P_2O_5$. When gases containing hydrogen chloride are available, it is obviously desirable to use the gases directly in the acidulation step (d) of the phosphate rock and to avoid separate production of aqueous hydrochloric acid prior to the reaction of phosphate rock. In this case, the absorption of HCl and the reaction with phosphate rock occur in the same unit. A disclosure on this feature appeared in the Bulletin of the Research Council of Israel, Vol. 11, No. 4, page 339. It is also possible to use a combination of aqueous hydrochloric acid and gases containing HCl for the acidulation of the phosphate rock in step (d). This permits the adjustment of the HCl concentration as desired, thus facilitating the water balance of the entire system.

After the reaction according to step (d), the insoluble matter settles, usually following the addition of a flocculant (e.g. Magnafloc R 455), as known in the art, and is separated step (e) by a common device such as filter, centrifuge or thickener. In order to remove the adherent mother liquor from the insoluble matter, one or two washings with tap water are suggested. The washing solutions obtained, containing some phosphoric acid (about 2–4% by wt) and possibly some hydrochloric acid (about 0.4–0.8% by wt), are utilized in step (a) for the preparation of the dissolution liquor to be used in the DCP manufacture as previously described. Therefore, it appears clear that the two processes can easily be adjusted to obtain from the rock phosphate the desired amount of DCP and the balance of $P_2O_5$ as phosphoric acid, according to the amount of mineral acid used in the first step. Any internal stream in the plant containing a mineral acid can be successfully used without causing any trouble and thus avoiding any $P_2O_5$ loss.

The clarified dissolution liquor is further processed for the manufacture of pure phosphoric acid by solvent extraction step (f), as described by Slack (Phosphoric Acid, Vol. I, part 1, pp. 43–44). The organic solvents preferred are n-butanol, n-pentanol, iso-amyl alcohol or mixtures thereof. These solvents selectively dissolve any phosphoric acid present in the dissolution liquor while the bulk of the calcium chloride, together with most of the cations normally present in phosphate rock, remains in the aqueous raffinate solution. The light phase of solvent extract is separated step (g) and passes to the next step (h) where the phosphoric acid is separated from the solvent. When a more purified phosphoric acid is required, the solvent extract may be purified in advance using a small amount of calcium-free pure phosphoric acid solution. This will remove the small amounts of calcium ion present in the solvent extract. The solvent extract is washed with pure water and thus the phosphoric acid-free organic solvent is recovered and recycled to step (f). The aqueous phase obtained in step (h) contains phosphoric acid, hydrochloric acid and small amounts of organic solvent, HF and $H_2SiF_6$. All these components are easily separated by evaporation using a multiple-effect evaporator, thus obtaining pure concentrated phosphoric acid (80–95% $H_3PO_4$ by wt).

The present invention provides in toto a coordinated system of two processes, both of which have many advantages due to their combination. The main advantages for the feed-grade DCP manufacture can be summarized as follows:

1. No defluorination of the dissolution liquor is required.
2. A considerable proportion of mineral acid is saved in the acidultion step (a).
3. Any diluted aqueous solution of a mineral acid selected from HCl, $H_3PO_4$ or $HNO_3$ may be utilized.
4. Any internal stream of the plant for the above two processes which contains acidic components, even of low concentration, may be utilized in step (a) — acidulation of part of the phosphate rock.
5. Relatively short reaction times are used in the production of the dissolution liquor for the DCP manufacture without causing any loss of $P_2O_5$.
6. From the solids which contain the unreacted phosphate rock, a fast separation occurs of the $P_2O_5$-containing solution.
7. The method enables enrichment of the $P_2O_5$ content of the unattacked phosphate, this being subsequently utilized for the phosphoric acid manufacture.

The main advantages for phosphoric acid manufacture can be summarized as follows:

1. The phosphate to be acidulated has a higher $p_2O_5$ content than that of the original phosphate rock.
2. The process is much more flexible than the known process for phosphoric acid by solvent extraction. The water balance can be regulated by combining it with the DCP manufacturing process, using any stream containing acidic components in the first step of acidulation.
3. Aqueous hydrochloric acid, gases containing hydrogen chloride or mixtures thereof can be used for the dissolution of the enriched phosphate rock which remains unattacked after separation of dissolution liquor utilized in the manufacture of DCP, thus permitting dissolution liquors with the optimal $P_2O_5$ concentrations to be obtained. Moreover, the fact that a part of the calcium carbonate has already been removed in step (a) implies a lower $CaCl_2$ concentration in the dissolution liquor and thus improves the equilibrium conditions for the absorption of hydrogen chloride.
4. The total $P_2O_5$ solubilization yield is very high since the attack on the phosphate rock is carried out in two separate steps.
5. Both processes are more flexible and can be easily coordinated to obtain either more feed-grade DCP or more pure phosphoric acid, according to the market requirements. The proportion of DCP and pure phosphoric acid produced depends on the amount of mineral acid utilized in the acidulation steps. In general, the ratio of the products is between 20–40% DCP and 80–60% pure $H_3PO_4$.

The invention is very useful particularly when by-product acidic components such as HCl, $HNO_3$ or $H_3PO_4$ are available.

In order to illustrate the nature of this invention further and the manner of practising the same, the following examples are presented for clearness of understanding therefrom, without being limited thereto, as modifications will be obvious to those skilled in the art. In all examples, the percentages given are on weight basis.

EXAMPLE 1

1000 kg of comminuted (70% minus 45 US mesh) calcareous phosphate rock containing 25% $P_2O_5$, 3.1% F, 10.7% $CO_2$ and 4.8% $H_2O$ (on wet basis) were mixed for 30 minutes with 3630 kg of a dilute solution of HCl (8%) at 18°–26° C. The solids settled down quickly and, in the supernatant solution containing 2.8% $P_2O_5$, the free acidity was found to be 40% (40% of the solubilized $P_2O_5$ was as $H_3PO_4$). The supernatant solution was separated from the solid matter and freed from suspended solids by means of a polishing filter; the weight of the suspended solids filtered off was 80 kg and the $P_2O_5$ content 10%. These solids were washed for the recovery of the phosphate values and the filtrate added to the clear solution obtained from the polishing filter. The total solution — clear filtrate combined with wash water — amounted to 4150 kg of a solution containing 2.6% $P_2O_5$ and 0.06 g/l fluorine; it was stirred with 108 kg of calcium carbonate (98% purity) and 48 kg of milk of lime which contained 7% by weight CaO. The precipitated DCP was filtered off and dried, thus obtaining 268 kg of dry DCP containing 40% $P_2O_5$ and 0.09% fluoride.

The solids separated after the acidulation step (a) contained 400 kg of enriched phosphate (32.5% $P_2O_5$) and 70 kg of adherent mother liquor which contained 2.8% $P_2O_5$. This was transferred to another vessel provided with a mixer and 1390 kg of aqueous hydrochloric acid solution (18% of wt HCl) were added and mixed for 25 minutes at a temperature of 70° C. 1543 kg of clarified dissolution liquor containing 7.1% $P_2O_5$ and 1.3% free HCl were removed. The insoluble matter residue was washed with tap water, providing 500 kg of wash water containing 2.2% $P_2O_5$; the solid residue after washing contained only 12 kg $P_2O_5$ and was discarded. The wash water solution was transferred to a storage tank and utilized for the acidulation step (a) in the manufacture of dicalcium phosphate.

The 1543 kg of dissolution liquor (7.1% $P_2O_5$, 1.3% HCl and 19.6% $CaCl_2$) were contacted in a battery of mixer-settlers with 1750 kg of iso-amyl alcohol in the presence of hydrochloric acid recycled from the phosphoric acid concentration step as described below. The raffinate brine, substantially free of $P_2O_5$, was discarded. The light phase of iso-amyl alcohol extract was separated and washed with 1030 kg of distilled water, thus resulting in pure aqueous acidic solution containing HCl, $H_3PO_4$ and traces of solvent. The alcohol raffinate was recycled to the extraction process. The pure aqueous acidic solution was concentrated in a triple-effect evaporator, the HCl returned in the extraction process and the solvent recycled to the solvent storage tank. 155 kg of pure phosphoric acid of 95% $H_3PO_4$ was obtained after concentration.

EXAMPLE 2

1000 kg of comminuted calcareous rock phosphate (70% minus 45 US mesh) with the same composition as that used in Example 1 (25% $P_2O_5$) were mixed for 30 minutes with 500 kg of acidic wash water containing 2.6% $P_2O_5$ (obtained by washing the insoluble matter in the acidulation stage for phosphoric acid manufacture) and 2340 kg of a dilute aqueous solution of hydrochloric acid (8% HCl). The solids settled quickly and, in the supernatant solution containing 2.2% $P_2O_5$, the free acidity was found to be 27% (27% of the solubilized $P_2O_5$ was in the form of $H_3PO_4$). The supernatant solution was separated from the suspended solids by means of a polishing filter. The weight of the suspended solids was 70 kg and the $P_2O_5$ content was 10%. The clear filtrate amounted to 3005 kg of a solution containing 2.2% $P_2O_5$ and 0.07 g/l fluorine; it was stirred with 55 kg of calcium carbonate (98% purity) and 23 kg of milk of lime which contained 7% by weight CaO. The precipitated DCP was filtered off and dried, thus obtaining 165 kg of dry DCP which contained 40% $P_2O_5$ and 0.09% by weight fluorine.

The solids separated after the first stage of acidulation amounted to 529 kg of enriched phosphate (35% $P_2O_5$) and 91 kg of adherent mother liquor which contained 2.2% $P_2O_5$. It was transferred to another vessel provided with a mixer, wherein 2088 kg of an aqueous hydrochloric solution (18% HCl) were added and mixed for 25 minutes at 70° C. The residue of insoluble matter was washed with tap water, thus providing 500 kg of wash water containing 2.6% $P_2O_5$ (to be used in another cycle for first acidulation of phosphate rock). The solid residue was 80 kg containing only 10% $P_2O_5$ and 320 kg of adherent mother liquor containing 9 kg $P_2O_5$. The supernatant dissolution liquor obtained after the acidulation, amounting to 2276 kg of a solution containing 6.9% $P_2O_5$, 1.8% HCl and 20% $CaCl_2$, was contacted with 2800 kg of iso-amyl alcohol in the presence of hydrochloric acid recycled from the phosphoric acid concentration step. The process was continued as described in Example 1. 223 kg of pure phosphoric acid of 95% $H_3PO_4$ were obtained.

EXAMPLE 3

In this experiment, the first acidulation of part of the phosphate rock was carried out with a dilute aqueous solution of nitric acid. The same amounts, conditions and operational sequences as in Example 1 were used in this experiment. The difference was the use of 3841 kg of nitric acid (13% $HNO_3$), the free acidity obtained being 40%. The amount of DCP recovered was 268 kg (40% $P_2O_5$), the fluorine content being 0.09%. The recovery of pure phosphoric acid was performed as described in Example 1, thus obtaining 155 kg of phosphoric acid (95% $H_3PO_4$).

EXAMPLE 4

Using the same amounts of reactants, the experiment was repeated as described in Example 2, except that the second acidulation of the enriched phosphate separated from the first acidulation step was performed with gases containing HCl obtained in the thermal decomposition of magnesium chloride and calcium chloride solutions. As described in Example 2, 1000 kg of phosphate rock were acidulated with 500 kg of wash water containing 2.6% $P_2O_5$ and 2340 kg of a dilute aqueous solution of hydrochloric acid (8% HCl). 165 kg of dry DCP were obtained.

To the 529 kg of solids of enriched phosphate (35% $P_2O_5$) containing, in addition, 91 kg of adherent mother liquor (2.2% $P_2O_5$), an amount of 1250 kg of tap water was added and the slurry contacted with gases containing hydrogen chloride (9.3% HCl, 46.8% $N_2$, 30.3% $H_2O$, 10.3% $CO_2$ and 3% $O_2$, all percentages by weight) in acidulation columns. The hydrogen chloride-containing gases passed through the acidulation columns countercurrently to the direction of the phosphate slurry flow. The hyrogen chloride-depleted combustion gas discharged from the top of the second acidulation column through a vent. The temperature in the acidulation column was in the range of 90° to 110° C. The 1810 kg of dissolution liquor obtained contained 8.4% $P_2O_5$, 1.6% HCl and 24% $CaCl_2$, and were processed in a similar manner to Example 2, thus resulting in 217 kg of pure phosphoric acid (95% $H_3PO_4$).

We claim:
1. A combined process for the manufacture of feed-grade DCP and pure phosphoric acid from phosphate rock which comprises:
   a. reacting excess comminuted calcareous phosphate rock with aqueous solutions of a mineral acid selected from the group consisting of hydrochloric acid, phosphoric acid and nitric acid in amounts such that the free acidity in the dissolution liquor does not exceed 60%;
   b. separating the clear solution from the solids;
   c. precipitating the feed-grade DCP from the clear solution obtained in step (b) by the addition of calcium hydroxide, calcium carbonate or mixtures thereof;
   d. reacting the solids obtained in step (b) with hydrochloric acid at a temperature between ambient temperature and approximately 120° C to produce an acidulant containing phosphoric acid and calcium chloride;
   e. separating the acidulant containing phosphoric acid and calcium chloride obtained in step (d), leaving a residue of insoluble matter;
   f. extracting the acidulant separated in step (e) with a phosphoric acid-miscible, calcium chloride- immiscible organic solvent selected from butanols, pentanols and mixtures thereof, to form a mutually immiscible brine phase containing calcium chloride and a phosphoric acid-solvent extract phase;

g. separating the phosphoric acid-solvent extract phase from the calcium chloride-containing brine phase and h. separating the phosphoric acid from the solvent extract phase obtained in step (g), said phosphoric acid-miscible solvent being recycled to step (f).

2. A combined process for the manufacture of feed-grade DCP and pure phosphoric acid according to claim 1, wherein the aqueous solution of the mineral acid in step (a) has a concentration of 2–20% by weight.

3. A combined process for the manufacture of feed-grade DCP and pure phosphoric acid according to claim 1, wherein the residue of insoluble matter obtained in step (e) is washed to obtain a phosphoric acid solution which is utilized in acidulation step (a).

4. A combined process for the manufacture of feed-grade DCP and pure phosphoric acid according to claim 1, wherein the free acidity of the dissolution liquor after the reaction of step (a) is in the range of 20 to 50%.

5. A combined process for the manufacture of feed-grade DCP and pure phosphoric acid according to claim 1, wherein the acidulation step (a) is carried out at ambient temperature.

6. A combined process for the manufacture of feed-grade DCP and pure phosphoric acid according to claim 1, wherein the acidulation in step (d) is performed using hydrochloric acid with a concentration of over 15% HCl by weight.

* * * * *